United States Patent [19]

Hartmann

[11] 4,432,277

[45] Feb. 21, 1984

[54] PRESSURE ROLLING NIP LINE PRESSURE CONTROL

[75] Inventor: Werner Hartmann, Krefeld, Fed. Rep. of Germany

[73] Assignee: Eduard Küsters, Krefeld, Fed. Rep. of Germany

[21] Appl. No.: 265,967

[22] Filed: May 21, 1981

[30] Foreign Application Priority Data

May 30, 1980 [DE] Fed. Rep. of Germany ....... 3020669

[51] Int. Cl.³ .......................... B30B 13/00; B30B 3/04
[52] U.S. Cl. ........................................ 100/37; 100/38; 100/162 B; 29/116 AD
[58] Field of Search ................. 100/93 RP, 162 B, 38, 100/37; 29/116 AD, 113 AD

[56] References Cited

U.S. PATENT DOCUMENTS

| | | | |
|---|---|---|---|
| 3,203,678 | 8/1965 | Sawyer et al. | 100/93 RP X |
| 4,074,624 | 2/1978 | Biornstad et al. | 29/116 AD |
| 4,233,011 | 11/1980 | Bolender et al. | 29/116 AD |
| 4,282,638 | 8/1981 | Christ et al. | 100/162 B |
| 4,282,639 | 8/1981 | Christ et al. | 100/162 B |

Primary Examiner—Peter Feldman
Attorney, Agent, or Firm—Kenyon & Kenyon

[57] ABSTRACT

Cooperating hard and soft paper calendering rolls have probes for measuring the soft roll's temperature at different zones along its length and units for controlling the nip line pressure in each zone in dependence of the zone's measured temperature.

5 Claims, 2 Drawing Figures

PRESSURE ROLLING NIP LINE PRESSURE CONTROL

BACKGROUND OF THE INVENTION

A pressure rolling nip is formed between any two mutually parallel cylindrical rolls pressed together. A web passed through the nip with the rolls rotating receives pressure rolling. One example is a paper calender having cooperating soft and hard rolls which pressure roll and, therefore, calender a paper web passed through the nip. A paper calender may include many rolls positioned one on top of another to form a stack.

In the following, only the soft roll and its cooperating hard roll which has a steel surface are involved. The soft roll has traditionally been made by a stack of circular paper disks pressed together under high compression to provide a cylindrical roll with a rolling surface that is ground to a smooth cylindrical surface. The soft surface of the paper roll forms the pressure rolling or calendering nip with its cooperating hard roll having the steel surface, the paper web being passed through this nip. If the web has a defect which is imprinted in the soft roll's surface, it may be necessary to regrind the soft roll's surface. This is expensive and, therefore, undesirable.

An an alternative, the soft roll can be a steel roll covered by a polyurethane layer. The polyurethane is applied to the steel roll's surface in liquid form and is cross-linked on this surface to form a compact coating. This kind of soft roll provides an excellent calendering effect on the paper. If during calendering, a web hard spot or doubled web passes through the calendering nip and forms an impression, the polyurethane layer recovers its original shape after one revolution of the roll so that no trace of the impression remains on the roll's surface. Polyurethane has enormous recoverability after deformation.

On the other hand, the polyurethane layer presents a heating problem. The steel surfaced hard roll and the soft polyurethane covered roll must be pressed together with enough force to cause the polyurethane to deform as it passes through the nip because this in cooperation with the hard roll is what provides the calendering action on the paper web passing through the nip. The polyurethane is not perfectly elastic and as it is deformed by the nip pressure and thereafter resiliently recovers, heat is produced in the polyurethane, the degree of heat depending on the extent of the deformation and recovery which is dependent on the nip line pressure. It is possible to cool the polyurethane layer so that such heating does not build up to temperatures causing degradation or possibly destruction of the polyurethane layer. However, if the nip line pressure, the pressure from end to end of the active portion of the nip through which the paper web is calendered, is not a uniform line pressure throughout, localized heating of the poyurethane layer to degrading or possibly destructive temperatures is possible. Such localized overheating cannot occur if the line pressure is uniform from end to end. Heretofore, this uniformity has been difficult to attain.

There is a kind of controlled deflection roll that permits the nip line pressure to be locally varied at a series of zones extending throughout the nip's length. Such a roll comprises a cylindrical steel shell roll which can form one of the two rolls forming the nip. This shell roll encircles a fixedly positioned beam providing an annular space between itself and the inside of the roll's shell. In this space on the nip side of the shell roll a series of fluid-actuated, radially-acting pressure-exerting units extend axially with respect to the shell, each unit being fixed to the beam and slidingly bearing on the shell's inside so as to exert its individual pressure against a localized zone on the inside of the shell. The shell roll, being made of steel which is elastic, can locally flex so as to deflect at each of the zones towards the other roll to thereby vary the line pressure of the nip formed between it and a cooperating roll, individually at the various zones.

An example of such a controlled deflection roll is shown by the Justus Pat. No. 3,119,324. The fluid pressure actuated units are in the form of cylinders containing pistons having rods extending into sliding engagement with the shell's inside. Each unit has its own individual pressurized fluid supply line. If each unit provides the same piston area for its fluid pressure actuation, and if each unit is supplied with the same fluid pressure, it is academically possible to provide a nip line pressure that is uniform from end to end of the nip. However, under practical operating conditions it is not possible to control the various fluid pressures of the various units so that consistently they are precisely the same, a non-uniform nip line pressure sometimes resulting.

The object of the present invention is to more precisely control the nip line pressure of the nip formed between a hard roll and a soft roll of the polyurethane covered type. It is possible that other plastic coverings may be used for the soft roll and which are equivalents in that they may have essentially the quick recovery and heating characteristics of polyurethane.

SUMMARY OF THE INVENTION

The above object is attained by the present invention by using the heating characteristics of the polyurethane layer on the soft roll to control the nip line pressure. Using the described kind of controlled deflection roll and with either of the two rolls covered with the polyurethane layer to form the soft roll, the pressure of each of the pressure units inside of the controlled deflection roll's shell roll is controlled in dependence on the surface temperature of the polyurethane layer at each of its zones acted on by the units. At any zone where the layer has a temperature increase, the pressure of the unit at that zone is decreased, and if there is a reduction in the temperature, it is increased.

Normally, the units are of the cylinder and piston type each provided with its own fluid pressure line, the pressure of which can be individually controlled. The polyurethane layer's external temperature can be determined by either a series of probes or a single traveling probe arranged in either case to measure the temperature of the polyurethane at each zone under the control of each of the individually controllable units. Automatic control can be made available by automatic control systems technicians.

DESCRIPTION OF THE DRAWINGS

The accompanying drawings are schematic and are for use in connection with the following detailed description of the invention, FIG. 1 being a longitudinal section showing the principles of the invention when the polyurethane layer is on the controlled deflection roll and the layer's temperature is measured by a series of stationary probes, and FIG. 2 being the same kind of view but in this instance showing the polyurethane layer on the solid steel roll with the temperature measuring being via a traveling probe.

DETAILED DESCRIPTION OF THE INVENTION

Figure 1:
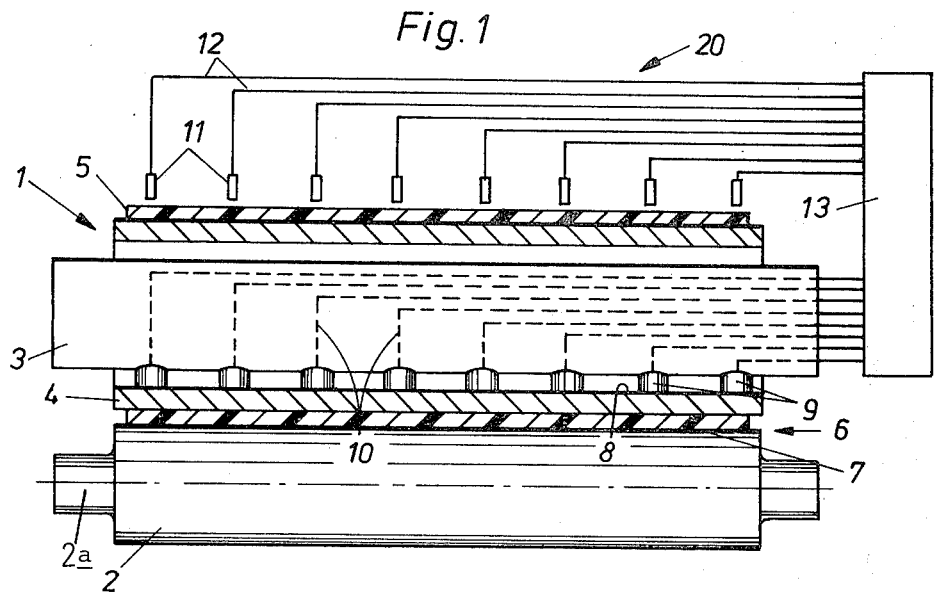

In FIG. 1 the controlled deflection soft roll is shown at 1 and the hard solid steel roll at 2. The hard roll's roll necks 2a rotate in stationary bearings (not shown) and being steel, this roll flexes downwardly like a beam under the rolling pressure applied by the controlled deflection roll.

The controlled deflection roll's internal beam is shown at 3 with its ends projecting and fixedly positioned by suitable means (not shown). The hollow shell roll 4 can move up and down throughout its length relative to the beam 3 because a circumferential space of adequate radial extent is provided between the beam 3 and the inside of the shell roll. This shell roll, made of steel and therefore flexible, has its outside covered with the polyurethane layer 5. The pressure rolling nip formed by the outside of this layer 5 and the surface of the roll 2 is indicated by the arrow 6. A paper web 7, having a thickness too small for clear illustration, is being pressure rolled for calendering through the pressure-rolling nip 6.

Hydraulically actuated pressure-exerting units 9 mounted by the beam 3 are evenly interspaced to form a series extending axially inside of the shell roll and slidingly engaging this inside. These units are shown schematically with the understanding that they can be of the hydraulically-actuated cylinder and piston types acting radially against the shell roll's inside. They normally would engage the inside of the shell roll through lubricated bearing shoes (not shown). Bearings (not shown) are used between the ends of the shell roll and the beam 3 to prevent horizontal movement while permitting vertical motion therebetween.

Each of the units 9 has an individual pressurized hydraulic liquid feed line 10. Each unit by deflection of the steel shell roll in a localized zone at the unit can cause the roll shell to deflect in that zone towards the solid steel roll 2. Therefore, the line pressure of the nip 6 can be changed at any of the zones. Eight of the units 9 are illustrated so in this case there are eight of these zones of roll deflection control.

A series of stationary temperature measuring probes 11 extend along the length of the polyurethane covered roll shell so as to measure the temperature of each of the zones established by the units 9, each probe connecting, such as electrically, by its own individual line 12, with the control system 13. This control system translates the temperature measurement obtained by any one of the probes 11 into the value of the hydraulic pressure fed to the one of the units 9 corresponding to that probe.

In operation, the web 7 is continuously pressure rolled for calendering with the control system 13 initially applying uniform hydraulic pressure to each of the units 9, this continuing as long as the probes measure the same temperature at each of the zones. As calendering continues, the polyurethane layer 5 inevitably begins to heat to non-uniform temperatures lengthwise of the roll 1. At any zone where there is a temperature increase, the control system 13 lowers the pressure applied to the corresponding one of the pressure-applying units 9, thus lowering the nip pressure at that zone. At any zone where there is a temperature decrease, the pressure of the unit 9 at that zone is increased. In the above way the temperature of the polyurethane layer 5 is kept uniform from end to end, and because this temperature is dependent on the nip line pressure, the latter is therefore automatically kept uniform throughout its extent. Localized heating of the polyurethane layer 5 to degrading and possibly destructive temperatures is prevented.

Academically, manual operation is possible. With each of the lines 12 provided with its own temperature measuring readout, and each of the pressure lines 10 manually controlled, an operator can adjust the pressures of the lines 10 as required to obtain uniform temperature readings from all of the probes 11.

Figure 2:
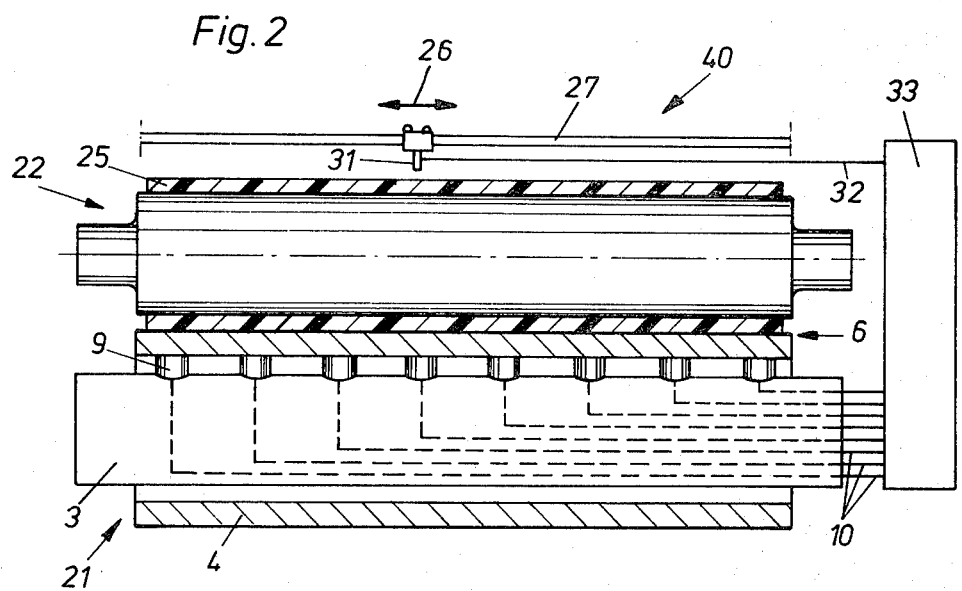

In FIG. 2 it is the solid steel roll 22 that is provided with the polyurethane layer 25 while the controlled deflection roll 21 is the one having the uncovered hard steel rolling surface. The stationary series of probes 11 is replaced by a single probe which continuously traverses the length of the layer 25 as indicated by the arrow 26, a trackway 27 being provided for this purpose on which the traveling probe 31 rides. This permits a single line 32 to carry the signal from the probe 31 to the control system 33 which otherwise functions zone-by-zone as described before. In this case also, any person skilled in the control system technology can provide the necessary hardware.

In both of the illustrated cases, the operation would normally be such as to provide a uniform nip line pressure from end to end of the nip 6, at least insofar as applies to the active portion of the nip through which the web passes. By keeping the nip line pressure uniform, localized heating of the polyurethane layer is prevented, or in other words, by keeping the temperature of the polyurethane layer uniform a uniform nip line pressure is obtained.

I claim:

1. A method for controlling the line pressure of a pressure rolling nip formed between two rotative pressure rolling rolls of which one has a pressure rolling surface formed by elastically deformable material which is deformed by the nip line pressure while rolling through the nip and thereafter resiliently recovers with consequent heating of the material dependent on the degree of its deformation and recovery, said method comprising measuring the temperature of said rolling surface at a plurality of zones extending along the rolling surface's length, and controlling said line pressure by causing one of said rolls to radially flex locally at each of said zones in the direction of the other roll so as to hold said zones at predetermined temperatures as a function of the measured temperature distribution.

2. The method of claim 1 in which said zones are held at the same temperatures so as to provide a nip line pressure that is uniform throughout its length.

3. A pressure rolling apparatus comprising at least two cooperating rotative pressure rolling rolls between which a pressure rolling nip is formed with a nip line pressure extending for the length of the nip, one of said rolls having a pressure rolling surface formed by elastically deformable material which is deformed by the nip line pressure while rolling through said nip and thereafter resiliently recovers with consequent heating of the material dependent on the degree of its deformation and recovery, at least one of said rolls being locally deflectable in the direction of the other roll at a plurality of zones spaced along its length and having deflection control means at each of said zones, each of the just said means being operable independently of the others, temperature measuring means for measuring the temperature of said pressure rolling surface localized at each of said zones, and means for causing operation of each of said deflection control means at each of said zones in response to the measuring means at that zone.

4. The apparatus of claim 3 in which said temperature measuring means comprises a plurality of temperature measuring probes, one for each of said zones.

5. The apparatus of claim 3 in which said temperature measuring means comprises a temperature measuring probe and means for causing it to traverse said zones.

* * * * *